US010208594B2

(12) United States Patent
Brotherton et al.

(10) Patent No.: US 10,208,594 B2
(45) Date of Patent: Feb. 19, 2019

(54) SYSTEMS AND METHODS FOR MONITORING EXTRACTION HEIGHT AND VOLUME OF MATERIAL EXTRACTED FOR A MINING MACHINE

(71) Applicant: Joy MM Delaware, Inc., Wilmington, DE (US)

(72) Inventors: Joshua V. Brotherton, Marion, IL (US); Justin S. Doerner, Mt. Vernon, IL (US)

(73) Assignee: Joy Global Underground Mining LLC, Warrendale, PA (US)

( * ) Notice: Subject to any disclaimer, the term of this patent is extended or adjusted under 35 U.S.C. 154(b) by 384 days.

(21) Appl. No.: 15/210,064

(22) Filed: Jul. 14, 2016

(65) Prior Publication Data

US 2017/0030192 A1    Feb. 2, 2017

Related U.S. Application Data

(60) Provisional application No. 62/199,550, filed on Jul. 31, 2015.

(51) Int. Cl.
*E21C 35/08* (2006.01)
*E21C 35/24* (2006.01)
*E21C 25/06* (2006.01)
*E21C 25/68* (2006.01)
(Continued)

(52) U.S. Cl.
CPC .............. *E21C 35/24* (2013.01); *E21C 25/06* (2013.01); *E21C 25/68* (2013.01); *E21C 27/24* (2013.01);
(Continued)

(58) Field of Classification Search
CPC .................................. E21C 41/00; E21C 35/08
(Continued)

(56) References Cited

U.S. PATENT DOCUMENTS 4,062,593 A    12/1977 Gapper et al.
4,228,508 A    10/1980 Benthaus
(Continued)

FOREIGN PATENT DOCUMENTS

CN    203114289 U    8/2013
CN    103541732 A    1/2014
(Continued)

OTHER PUBLICATIONS

Search Report from the United Kingdom Intellectual Property Office for Application No. GB1612602.1 dated Jan. 6, 2017 (3 pages).
Search Report from the Polish Patent Office for Application No. P-418131 dated Jan. 25, 2017 (2 pages).

*Primary Examiner* — Sunil Singh
(74) *Attorney, Agent, or Firm* — Michael Best & Friedrich LLP

(57) ABSTRACT

Systems and methods for monitoring extraction height and volume of material extracted for a mining machine. The method includes operating the machine using a shearing motion at a plurality of cut locations. The method includes receiving boom height data and power consumption data. The method includes determining a cut start time, based on a conveyor motor start time, and a conveyor motor stop time. The method includes determining whether a relocation has occurred. The method includes, when the relocation has occurred: determining a cut end time based on conveyor motor stop time and the relocation; and storing, in a memory, the cut start and end time, and the boom height and power consumption data. The method includes adjusting the operation of the mining machine based on the cut start and end time, and the boom height and power consumption data for at least one of the cut locations.

20 Claims, 11 Drawing Sheets

(51) Int. Cl.
 *E21C 41/00* (2006.01)
 *E21F 13/02* (2006.01)
 *G01B 21/08* (2006.01)
 *G01F 17/00* (2006.01)
 *E21C 27/24* (2006.01)

(52) U.S. Cl.
 CPC ............ *E21C 35/08* (2013.01); *E21C 41/00* (2013.01); *E21F 13/025* (2013.01); *G01B 21/08* (2013.01); *G01F 17/00* (2013.01)

(58) Field of Classification Search
 USPC ................................................ 299/1.05–1.9
 See application file for complete search history.

(56) References Cited

U.S. PATENT DOCUMENTS

| | | | |
|---|---|---|---|
| 4,952,000 | A | 8/1990 | Lipinski et al. |
| 5,116,103 | A | 5/1992 | Lewins et al. |
| 5,228,751 | A | 7/1993 | Ramsden, Jr. |
| 6,666,521 | B1 | 12/2003 | Pease et al. |
| 8,528,988 | B2 | 9/2013 | Von Schonebeck et al. |
| 8,567,871 | B2 | 10/2013 | Junker et al. |
| 8,622,479 | B2 | 1/2014 | Hargrave et al. |
| 9,657,567 | B2 * | 5/2017 | Malayappalayam Shanmugam ........... E21F 17/18 |

FOREIGN PATENT DOCUMENTS

| | | |
|---|---|---|
| PL | 68723 Y1 | 11/2016 |
| WO | 9624753 A1 | 8/1996 |
| WO | 2011130687 A2 | 10/2011 |

\* cited by examiner

SYSTEMS AND METHODS FOR MONITORING EXTRACTION HEIGHT AND VOLUME OF MATERIAL EXTRACTED FOR A MINING MACHINE

RELATED APPLICATIONS

This application claims the benefit of U.S. Provisional Patent Application No. 62/199,550, filed Jul. 31, 2015, the entire contents of which are incorporated herein by reference.

FIELD

Embodiments of the present invention relate to systems and methods for monitoring the extraction height and the volume of material extracted in underground continuous mining environments.

BACKGROUND

Mining machines, such as continuous mining machines are used to remove material (e.g., coal) from underground mines, for example, room and pillar mines. A continuous mining machine removes coal from a mine wall using a boom-mounted rotating cutting drum that moves with a vertical shearing (i.e., up and down) motion while the machine advances into the mine wall. As the shearing motion removes the coal, a conveyor on the continuous mining machine operates to move the coal to the rear of the machine and into coal cars. The continuous mining machine operates to make a series of cuts in a coal seam.

SUMMARY

Monitoring the extraction height and the volume of material extracted from a cut provides data that can be used to alter mining objectives, identify operator training opportunities, alter mining operations to reduce wear on production equipment, reduce over-extraction costs, and the like. Accordingly, embodiments of the invention provide methods and systems for automated monitoring of the extraction height and the volume of material extracted in underground continuous mining environments.

One embodiment provides a method for monitoring a mining machine including an electronic controller. The method includes operating the mining machine to cut into a mine face using a shearing motion at a plurality of cut locations. The method includes receiving, with the electronic controller from a boom height sensor, boom height data. The method includes receiving power consumption data for a cutting drum motor. The method includes determining a cut start time based on a conveyor motor start time. The method includes determining a conveyor motor stop time. The method includes determining whether a relocation has occurred. The method includes determining a cut end time based on conveyor motor stop time and the relocation when the relocation has occurred. The method includes storing, in a memory coupled to the electronic processor, the cut start time, the cut end time, the boom height data, and the power consumption data when the relocation has occurred. The method includes adjusting the operation of the mining machine based on the cut start time, the cut end time, the boom height data, and the power consumption data for at least one of the plurality of cut locations.

In another embodiment, the method includes sorting the boom height data and the power consumption data into a plurality of bins. The method includes determining a plurality of extraction heights, each of the plurality of extraction heights based on one of the plurality of bins. The method includes determining a subset of extraction heights based on the plurality of extraction heights and an extraction height threshold. The method includes determining an average extraction height for the cut location based on the subset of extraction heights, and storing, in the memory, the average extraction height.

Another embodiment provides a mining machine. The mining machine includes a cutting drum, including a cutting drum motor; a boom height sensor; a memory; and an electronic controller coupled to the boom height sensor, the cutting drum motor, and the memory. The electronic controller is configured to operate the mining machine to cut into a mine face with the cutting drum in a shearing motion at a plurality of cut locations. The electronic controller is configured to receive, from the boom height sensor, boom height data. The electronic controller is configured to receive power consumption data for the cutting drum motor. The electronic controller is configured to determine a cut start time based on a conveyor motor start time, and a conveyor motor stop time. The electronic controller is configured to determine whether a relocation has occurred. The electronic controller is configured to, when the relocation has occurred: determine a cut end time based on conveyor motor stop time and the relocation, and store, in a memory coupled to the electronic processor, the cut start time, the cut end time, the boom height data, and the power consumption data. The electronic controller is configured to adjust the operation of the mining machine based on the cut start time, the cut end time, the boom height data, and the power consumption data for at least one of the plurality of cut locations.

Other aspects of the invention will become apparent by consideration of the detailed description and accompanying drawings.

DETAILED DESCRIPTION

Figure 1A:
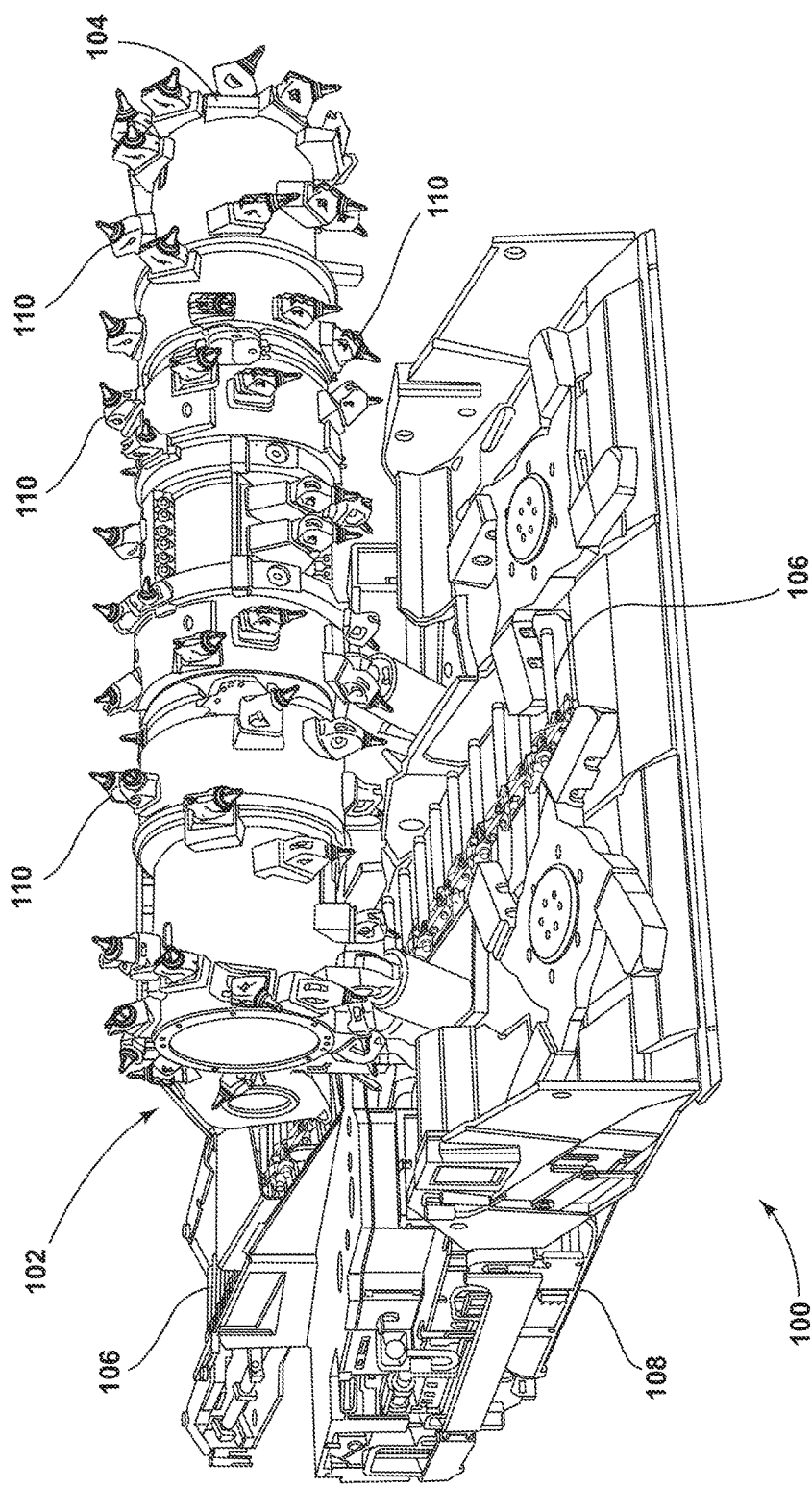
FIG. 1A and FIG. 1B illustrate a continuous mining machine according to some embodiments.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (that is, stored on non-transitory computer-readable medium) executable by one or more electronic processors. Furthermore, and as described in subsequent paragraphs, the specific mechanical configurations illustrated in the drawings are intended to exemplify embodiments of the invention and that other alternative mechanical configurations are possible. Also, "controllers" described in the specification can include processing components, such as one or more electronic processors (e.g., microprocessors, digital signal processors (DSP), field programmable gate arrays (FPGA), application specific integrated circuits (ASIC), and the like), non-transitory computer-readable memory modules, input/output interfaces, and various connections (e.g., a system bus) connecting the components.

Figure 1B:
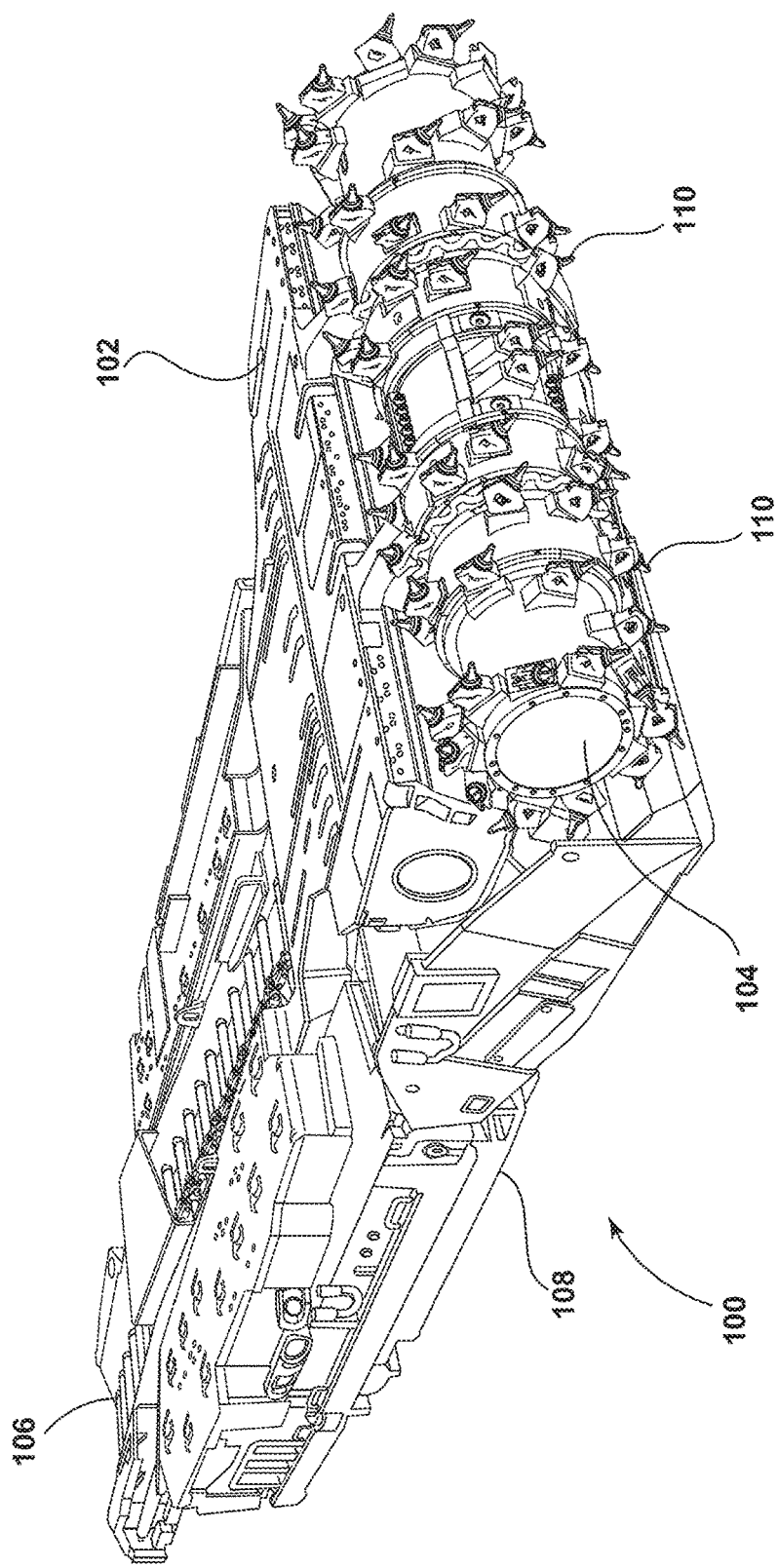

FIG. 1A and FIG. 1B illustrate an exemplary continuous mining machine 100. By way of example, the continuous mining machine 100 is described herein as mining coal. In alternative embodiments, the continuous mining machine 100 may be used to mine other substances. The continuous mining machine includes a cutting boom 102, a cutting drum 104, a conveyor 106, and a tram system 108. The cutting drum includes suitable cutting bits 110 to tear or gouge coal from a mine face (not shown) as the continuous mining machine 100 is advanced into the mine face while the cutting drum is rotated by a cutting drum motor 112 (depicted schematically in FIG. 2). The conveyor 106 is operated by a conveyor motor 114 (depicted schematically in FIG. 2) to move coal from the cutting drum 104 to the rear of the continuous mining machine 100 during mining.

The tram system 108 includes a track chain on each side of the continuous mining machine 100 that can each be independently controlled to operate at the same or at different speeds. When track chains are set to the same speed and direction, the tram system 108 moves the continuous mining machine 100 straight in one direction. The tram system 108 can move the continuous mining machine 100 to the left or to right depending on whether the speed of the track chains are increased or decreased. For example, if the speed of the right track chain is decreased to be less than the speed of the left track chain the left track chain is moving faster, which causes the continuous mining machine 100 to turn to the right. Accordingly, the tram system 108 operates to tram (i.e., move) the continuous mining machine 100 within a mining environment.

Figure 2:
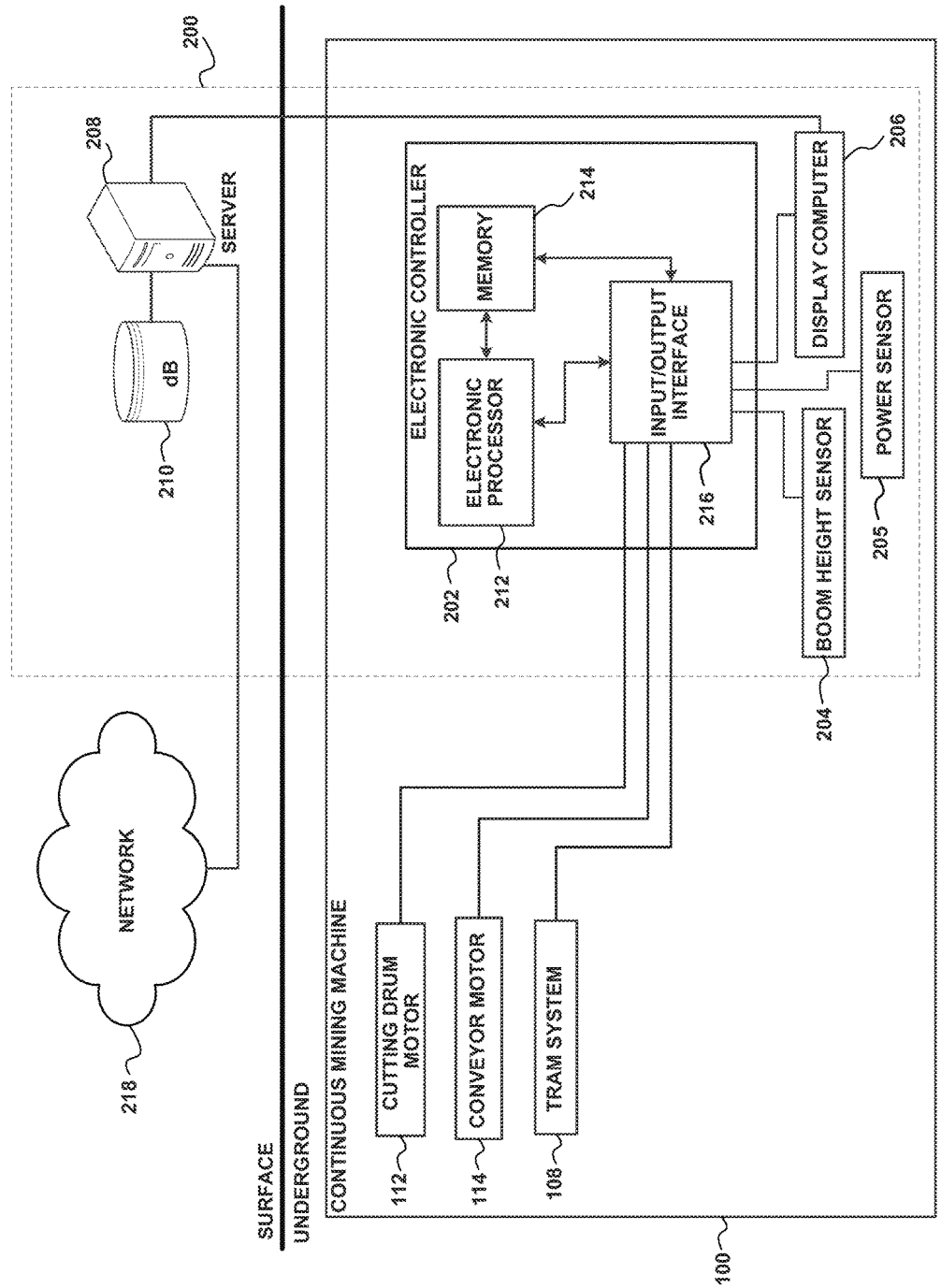
FIG. 2 schematically illustrates a control system for the continuous mining machine of FIG. 1 according to some embodiments.

FIG. 2 schematically illustrates an exemplary control system 200, as well as some elements of the continuous mining machine 100. The control system 200 includes an electronic controller 202, a boom height sensor 204, a power sensor 205, a display computer 206, a server 208, and a database 210. The components of the control system 200 are communicatively coupled, by one or more control or data buses, or a combination thereof. The components of the control system 200 may communicate over wired connections, wireless connections, or a combination thereof. The embodiment illustrated in FIG. 2 is provided merely as one example; the control system 200 may include additional, fewer, or other components than those illustrated.

The electronic controller 202 includes an electronic processor 212 (for example, a microprocessor, or other electronic controller), a memory 214, and an input/output interface 216. The electronic processor 212 is configured to retrieve instructions and data from the memory 214 and execute, among other things, instructions to perform the methods described herein, including the methods 400 and 500 or portions thereof. The memory 214 may include read-only memory (ROM), random access memory (RAM), other non-transitory computer-readable media, or a combination thereof. The input/output interface 216 receives information from, and sends information to, components and devices outside the electronic controller 202. For example, the input/output interface 216 can transmit signals, data, instructions, and queries to mechanical and electrical equipment located outside the electronic controller 202 that operate and control the continuous mining machine 100.

In one embodiment, the boom height sensor 204 is a transducer, which communicates to the electronic controller 202 data relating to the height of the cutting boom 102. The boom height sensor 204 is positioned and calibrated to provide position information for the cutting boom 102. The boom height sensor 204 is coupled to the electronic controller 202, which determines boom position (e.g., height) from data acquired through the boom height sensor 204 while the cutting drum 104 is shearing up and down. In some embodiments, the boom height data is calibrated using data from other sensors on the continuous mining machine 100 including, for example, chassis angle sensors.

The power sensor 205 is a sensor (e.g., a transducer) coupled to the electronic controller 202. The power sensor 205 is positioned and calibrated to provide power consumption data for a component of the continuous mining machine 100, which data may be used to indicate when the continuous mining machine 100 is being used to remove material. For example, the electronic controller 202 may generate power consumption data for the cutting drum motor 112, using the power sensor 205 (e.g., a current sensor or voltage sensor). As set forth below, a power consumption level above a threshold indicates that the cutting drum motor 112 is rotating the cutting drum 104 to extract material from a cut location, rather than rotating the cutting drum 105 while it is not in contact with the mine face.

The display computer 206 provides a human machine interface (HMI) to the control system 200. In one example, the display computer 206 is a computer having devices to receive input from an operator (for example, a keyboard, mouse, or touchscreen) and devices to provide output to the operator (for example, one or more display screens). In other embodiments, the display computer 206 may be a mobile computing device (e.g., a smart telephone or tablet computer), or other electronic device capable of operating as described herein. The display computer 206 and the electronic controller 202 are electrically connected and communicate electronically using one or more network protocols including, for example, TCP/IP, UDP, supervisory control and data acquisition (SCADA), and OLE for process control (OPC). The electronic controller 202 communicates events, alarms, and sensor data, relating to the continuous mining machine 100, to the display computer 206. The display computer 206 stores such information in one or more memory structures.

The control system 200 or portions thereof may be included in the continuous mining machine 100 or may be remote from the continuous mining machine 100. For example, some components of the control system 200 may be located on the surface, while some may be located underground. In the embodiment illustrated, the surface portion of the control system 200 includes the server 208, which is communicatively coupled to the display computer 206. The server 208 and the display computer 206 are communicate electronically using one or more network protocols including, for example, TCP/IP, UDP, supervisory control and data acquisition (SCADA), and OLE for process control (OPC). The server 208 may also be connected to a network 218 (e.g., a corporate network or networks, or the internet). The display computer 206 sends event, alarm, and sensor data from the mining machine to the server 208. For example, the display computer 206 may send the data directly to a database 210 (e.g., a MySQL database), coupled to the server 208 on the surface. In another example, UDP packets received by the electronic controller 202 are converted into OPC data and consolidated into flat files by the display computer 206, which sends the flat files to the server 208. The flat files may be stored locally (e.g., in the database 210), or sent to a remote database.

As illustrated, the electronic controller 202 is coupled to the cutting drum motor 112, the conveyor motor 114, and the tram system 108. The electronic controller 202 sends and receives control and status data to and from the cutting drum motor 112, the conveyor motor 114, and the tram system 108. For example, the electronic controller 202 may receive data from the tram system 108 indicating the speed and direction of the track chains. In another example, the electronic controller 202 receives data indicating whether or not the cutting drum motor 112 or the conveyor motor 114 are operating.

Figure 3A:
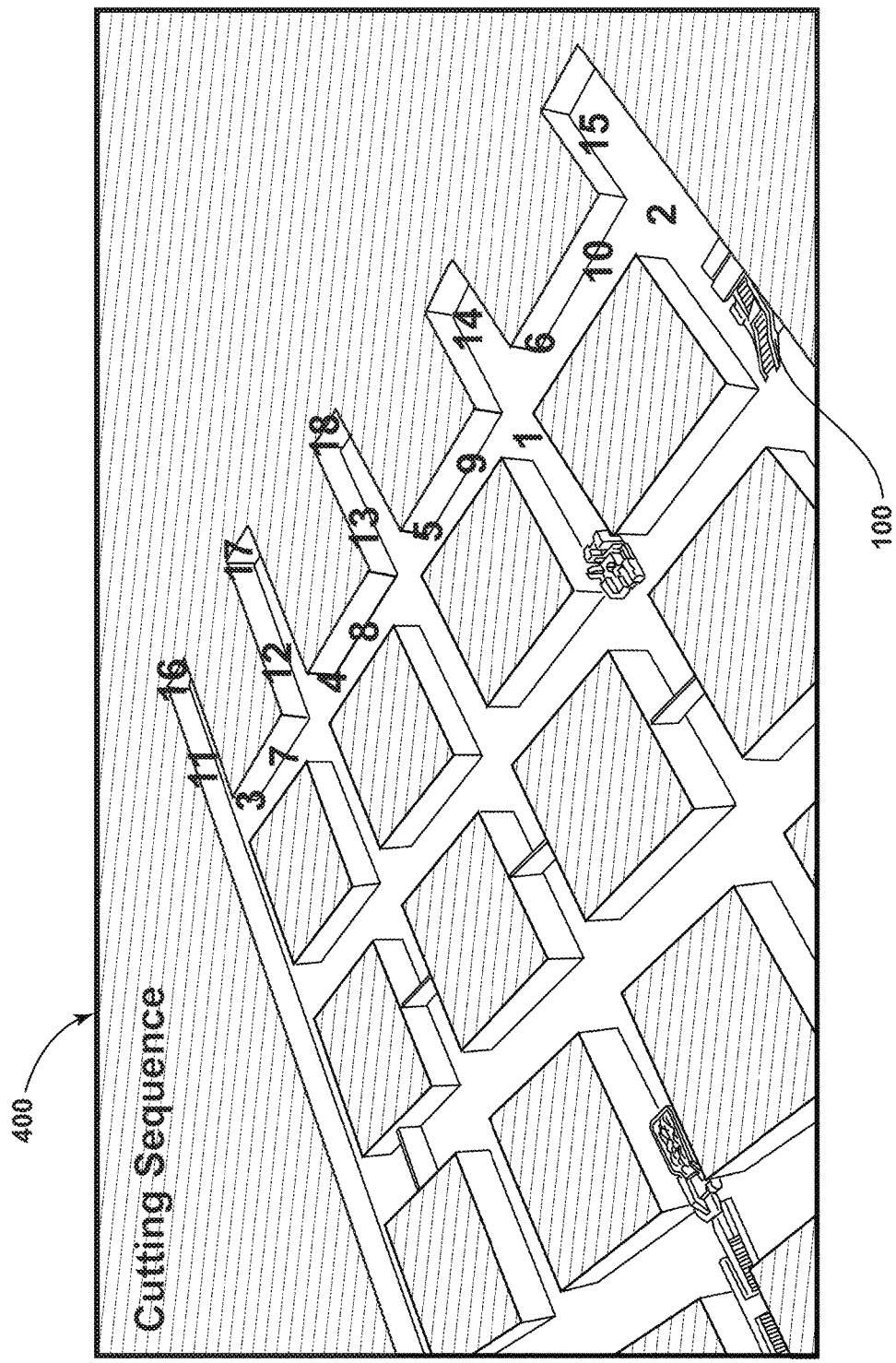
FIG. 3A, FIG. 3B, and FIG. 3C illustrate a continuous mining machine operating in a room and pillar mine according to some embodiments.
Figure 3B:
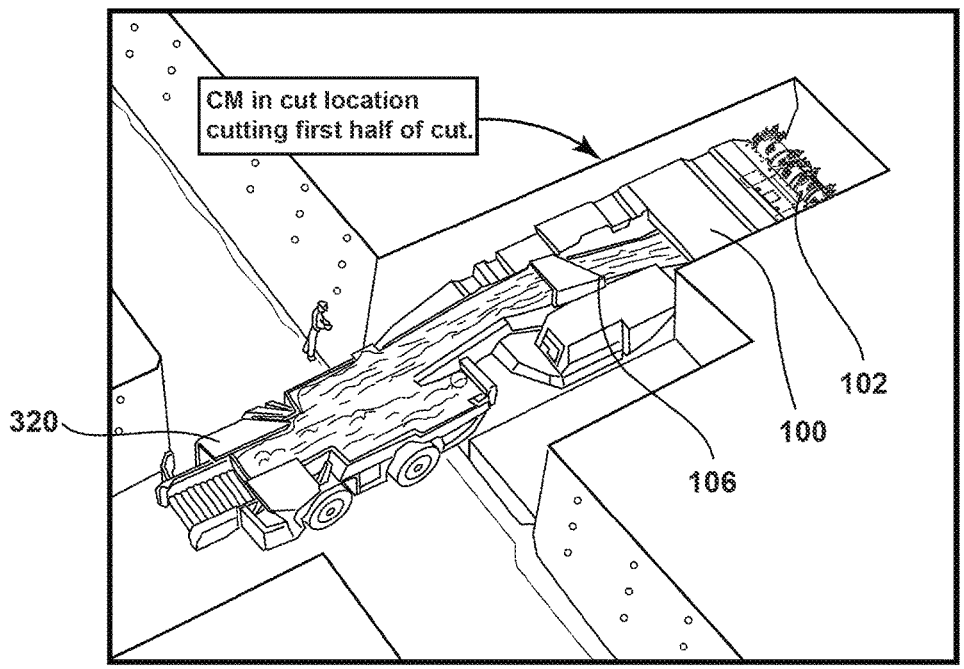
Figure 3C:
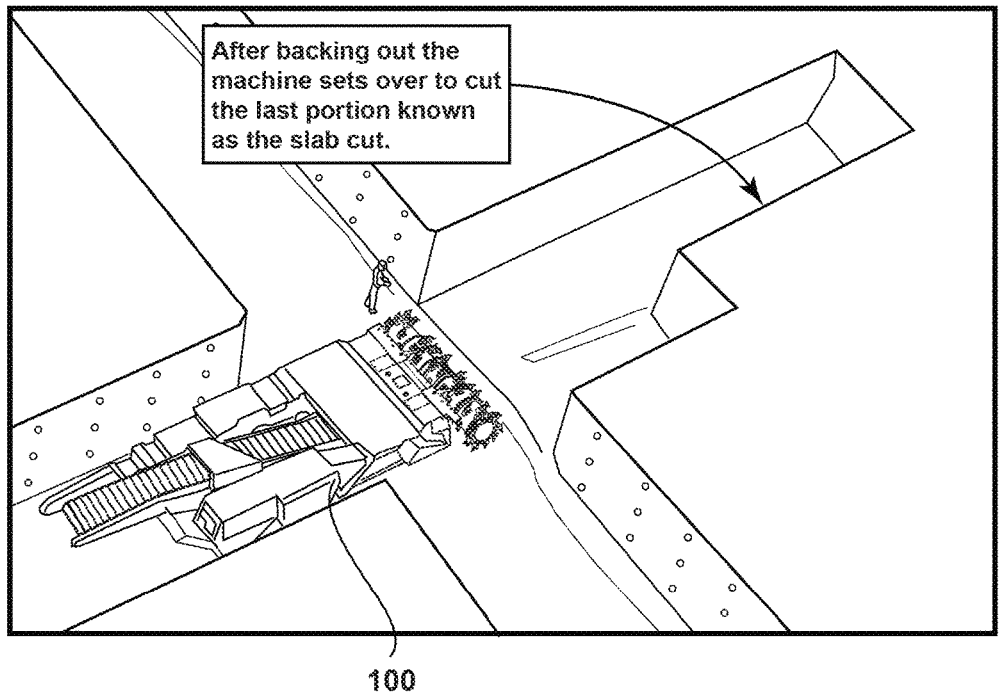

FIG. 3A, FIG. 3B, and FIG. 3C illustrate an example of the continuous mining machine 100 operating in a room and pillar mine 300. In FIG. 3B, the continuous mining machine 100 operates to remove coal from the mine face by advancing into the mine face while shearing. Shearing is the repetitive movement of the cutting boom 102 from a lower position, as shown in FIG. 1A, to an upper position, as shown in FIG. 1B, or vice versa. During shearing, the vertical distance between the lowest height and the highest height, from which material is removed by the cutting drum 104, is known as the extraction height. The cutting drum 104 is rotated by a cutting drum motor 112 and removes coal from the mine face. The conveyor 106 is driven by the conveyor motor 114 to move coal from the cutting drum 104 to the rear of the continuous mining machine 100 into a coal car 302. The cutting drum motor 112 and the conveyor motor 114 are known as production motors. When a production motor is operating, the continuous mining machine 100 is in production (i.e., mining coal). In alternative embodiments, other motor configurations may indicate production.

As illustrated in FIG. 3A, the continuous mining machine 100 mines coal by making cuts at cut locations 1 through 18. A cut is the operation of the continuous mining machine 100 to remove coal from a cut location. A cut is made in two passes. FIG. 3B illustrates the continuous mining machine 100 making the first half of a cut at a cut location. When the first half of the cut is made, the continuous mining machine 100 backs out of the cut location, using the tram system 108, and "sets over." Setting over lines up the continuous mining machine 100 to make the second half of the cut (i.e., the slab cut). FIG. 3C illustrates the continuous mining machine 100 preparing to make a slab cut. When the continuous mining machine 100 has completed a cut, it performs a relocation (i.e., it moves to the next cut location). Returning to FIG. 3A, through a series of cuts, set overs, and relocations, the continuous mining machine 100 has made cuts at cut locations 1 through 18, removing coal from the coal seam, and leaving behind pillars within the mine to form the room and pillar mine 300. Due to a number of factors (e.g., variances in makeup of the coal seam, different techniques used by mining operators, machine maintenance, and the like), the time it takes to make a cut may vary for each cut location. The quantity of coal extracted from a cut can be determined using the extraction height and the time of a cut (e.g., determined from start and end times for the cut operation), which can in turn be used to alter the operation of the continuous mining machine 100.

Figure 4:
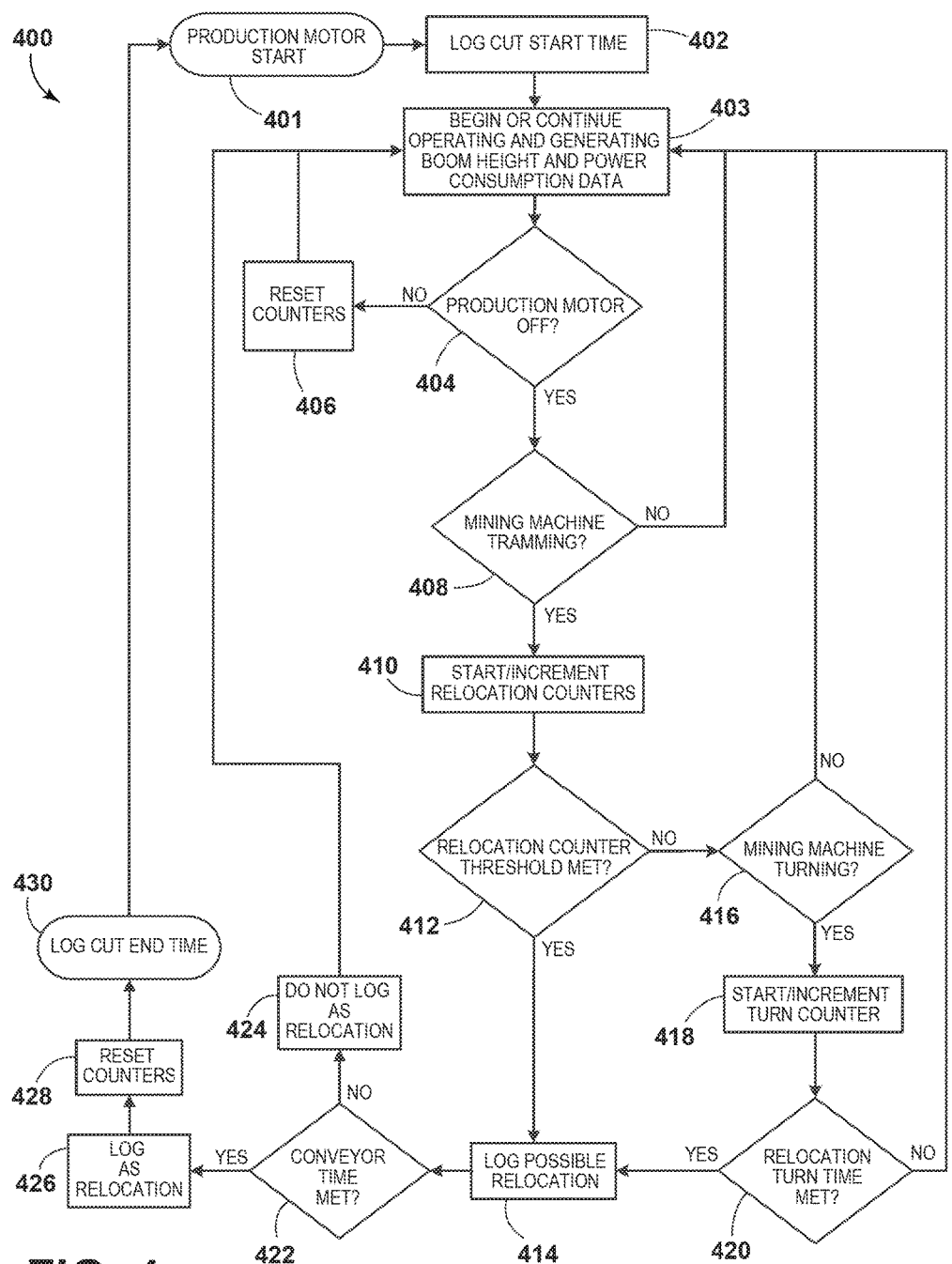
FIG. 4 is a flow chart illustrating a method for finding cut location start and end times for the continuous mining machine of FIG. 1 according to some embodiments.

FIG. 4 illustrates an exemplary method 400 for the electronic controller 202 to determine cut location start and end times. It should be noted that the method 400 may be carried out using controllers other than the electronic controller 202. The method 400 starts when the continuous mining machine 100 is positioned in front of a mine face to be cut (i.e., a cut location). At block 401, the production motor is started. For example, the conveyor motor 114 start signals that the first coal car has pulled up behind the continuous mining machine 100 and is ready to be loaded with coal. Accordingly, the cut start time is determined from the first time the conveyor motor 114 is turned on (i.e., the conveyor motor start time) after the continuous mining machine 100 is positioned at the cutting face. At block 402, the time the conveyor motor 114 is turned on is logged (e.g., recorded in the memory 214) as the cut start time.

Figure 6:
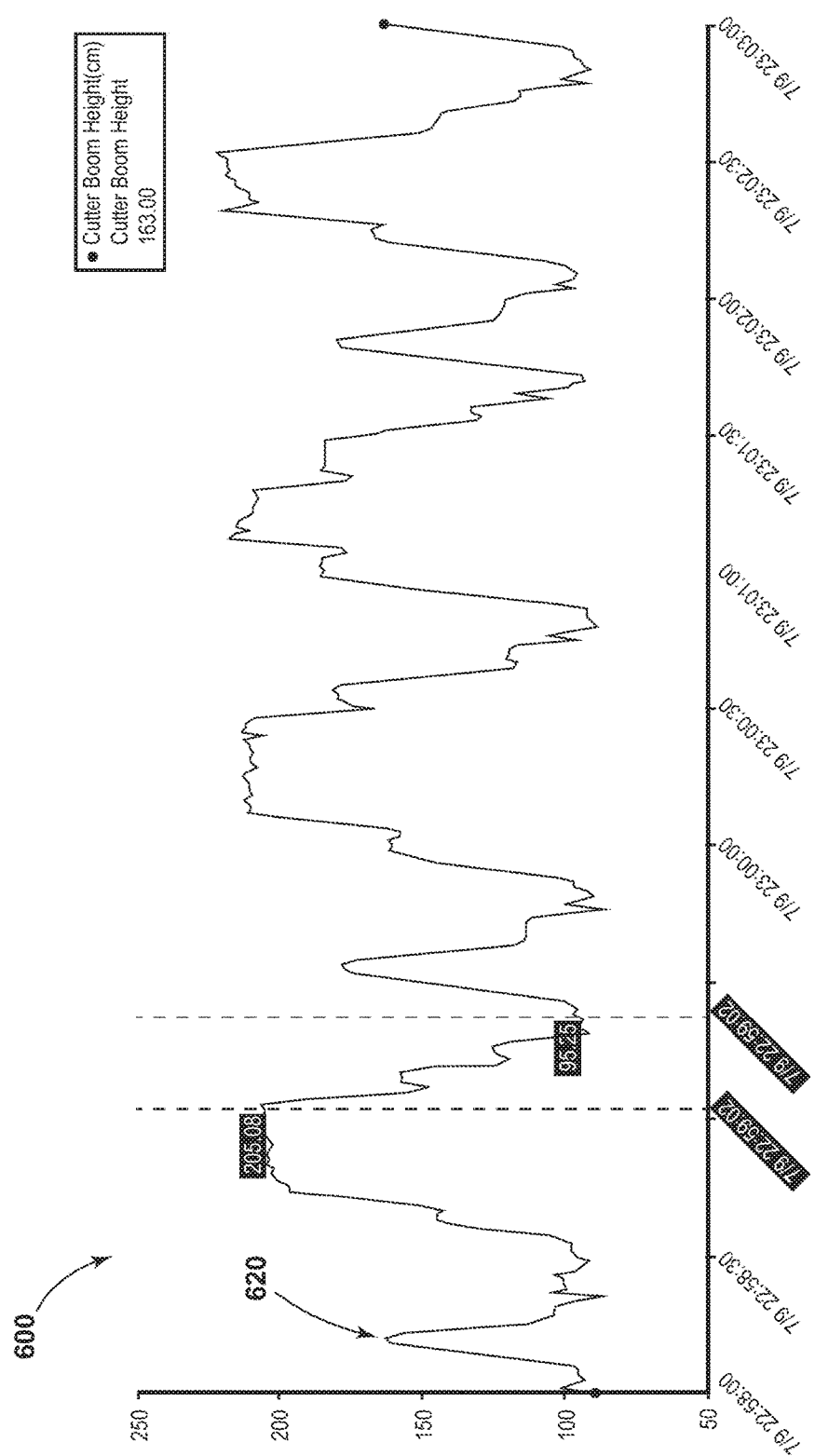
FIG. 6 is a chart illustrating the cutting boom height over time according to some embodiments.

At block 403, the continuous mining machine 100 begins, or continues, to operate to make a cut by operating in a shearing motion while advancing into the coal seam. While the continuous mining machine 100 is operating to make a cut, the electronic controller 202 generates boom height data using signals received from the boom height sensor 204. The boom height data represents the height of the boom 102 as the shearing operation moves the cutting drum 104 up and down the coal seam (i.e., the mine face). For example, FIG. 6 illustrates a chart 600, which includes a trend line 602, depicting the boom height over time. In some embodiments, the boom height data may be generated by using additional sensors (e.g., a chassis angle sensor).

While the continuous mining machine 100 is operating to make a cut, the electronic controller 202 also generates power consumption data. In some embodiments, the power consumption data is for the cutting drum motor 112 (e.g., the amps drawn by the cutting drum motor 112). In such embodiments, the power consumption data may be generated using signals received from the power sensor 205, the data may be received from the cutting drum motor 112 directly (e.g., from sensors integral to the motor), or it may be determined by the electronic controller 202 (e.g., based on control signals sent to the motor). In other embodiments, the electronic controller 202 generates power consumption data for other types of propulsion of the continuous mining machine 100 (e.g., hydraulic).

Returning to FIG. 4, at block 404, the electronic controller 202 determines whether the production motor is off. When the production motor is not off, the relocation counters (explained below) are reset, and the continuous mining machine 100 continues operating at block 403. As noted above, a cut start time is logged when the continuous mining machine 100 begins a cut at a cut location. When a cut is complete (i.e., both passes have been made at a cut location), the continuous mining machine 100 performs a relocation (i.e., moving to another cut location). A cut end time is determined from the last time the conveyor motor 114 was operating before relocation occurs (i.e., the conveyor motor stop time). To determine a cut end time, the method 400 determines whether a relocation has occurred. During a relocation, the production motor is off, and the continuous mining machine 100 trams (i.e., moves) to another cut location. Accordingly, at block 408, it is determined whether the continuous mining machine 100 is tramming. When the continuous mining machine 100 is not tramming, the method 400 continues at block 403.

When the continuous mining machine 100 is tramming (e.g., when the tram system 108 is operating), relocation counters are started or incremented, at block 410. Because the production motor is off during a relocation, the production motor turning off may indicate that a relocation is occurring. However, during a cut, the production motor may turn off and one or more times (e.g., when the continuous mining machine 100 "sets over" to begin a second pass, to change coal cars, for brief maintenance, etc.). Accordingly, one embodiment of the method 400 uses relocation counters to determine whether a relocation has occurred. Each relocation counter represents period of time, during which a condition or operation of the machine is present or occurring. For each relocation counter, a threshold is determined. When a relocation counter's threshold is met, it indicates that a possible relocation has occurred. Relocation counters include, for example, a relocation threshold time (e.g., the amount of time the continuous mining machine 100 has been in a relocation condition), a relocation check tram time (e.g., the amount of tram time that must accumulate for the movement to be considered an actual relocation), and a relocation wait check time (e.g., the amount of time that the continuous mining machine 100 can be idle (i.e., not ramming) after initiating the relocation counters before checking to see if a relocation actually occurred).

At block 412, the relocation counters are checked to determine if any meet their respective thresholds. When a relocation counter threshold is met, a possible relocation is logged, at block 414. When no threshold is met, the electronic controller 202 determines whether the continuous mining machine 100 is turning, at block 416. To determine whether the continuous mining machine 100 is turning at a given moment, the following equation may be used to determine how much the machine is turning in that moment:

$$\% \text{ Deg/Sec} = (\text{RHTramSpeed}/\text{TrackDist} - \text{LHTramSpeed}/\text{TrackDist})*360/2$$

where RHTramSpeed is the speed of the right track chain of the tram system 108, LHTramSpeed is the speed of the left track chain of the tram system 108, and TrackDist is the distance from the center of the continuous mining machine 100 to the respective track chains. The % Deg/sec is compared to a set point (in degrees), which, when met, indicates that the continuous mining machine 100 is turning in that second.

When the continuous mining machine 100 is not turning, the continuous mining machine 100 continues operating, at block 403. When the continuous mining machine 100 is turning, a track counter is started or incremented, at block 418. At block 420, the electronic controller 202 determines whether a relocation turn time threshold (e.g., the amount of time the machine must be considered turning to indicate a possible relocation) has been met. The relocation turn time threshold is set to detect short moves of the continuous mining machine 100 (e.g., backing out of one cut location and turning 90° to begin cutting into the face). Such short moves indicate a relocation, but the relocation counter threshold may not be met because of the short distance between cut locations. Accordingly, when the relocation turn time threshold is met, a possible relocation is logged, at block 414. When the relocation turn time threshold is not met, the continuous mining machine 100 continues operating, at block 403.

When a possible relocation is logged, at block 414, it indicates that a relocation may have occurred. The use of relocation counters helps to ensure that a relocation has occurred, rather than, for example, the continuous mining machine 100 performing a set over in the same cut. At block 422, the electronic controller 202 determines whether a conveyor time threshold has been met. The total time the conveyor motor was on between the start and end of the calculated cut is compared to a threshold time that the conveyors must be on to signify that a cut occurred. When the conveyor time threshold is not met, the possible relocation is determined not to be a relocation, at block 424, and the continuous mining machine 100 continues operating, at block 403.

When the conveyor time threshold is met, it indicates that a relocation, and not a set over or other event, has occurred. Accordingly, a relocation is logged, at block 426; the relocation counters are reset, at block 428; and the cut end time is logged, at block 430. The cut end time is determined from the last time the conveyor motor 114 was operating before the relocation, logged at block 426, occurred. The method 400 continues at block 401 when the production motor starts to begin mining at a new cut location.

Figure 5:
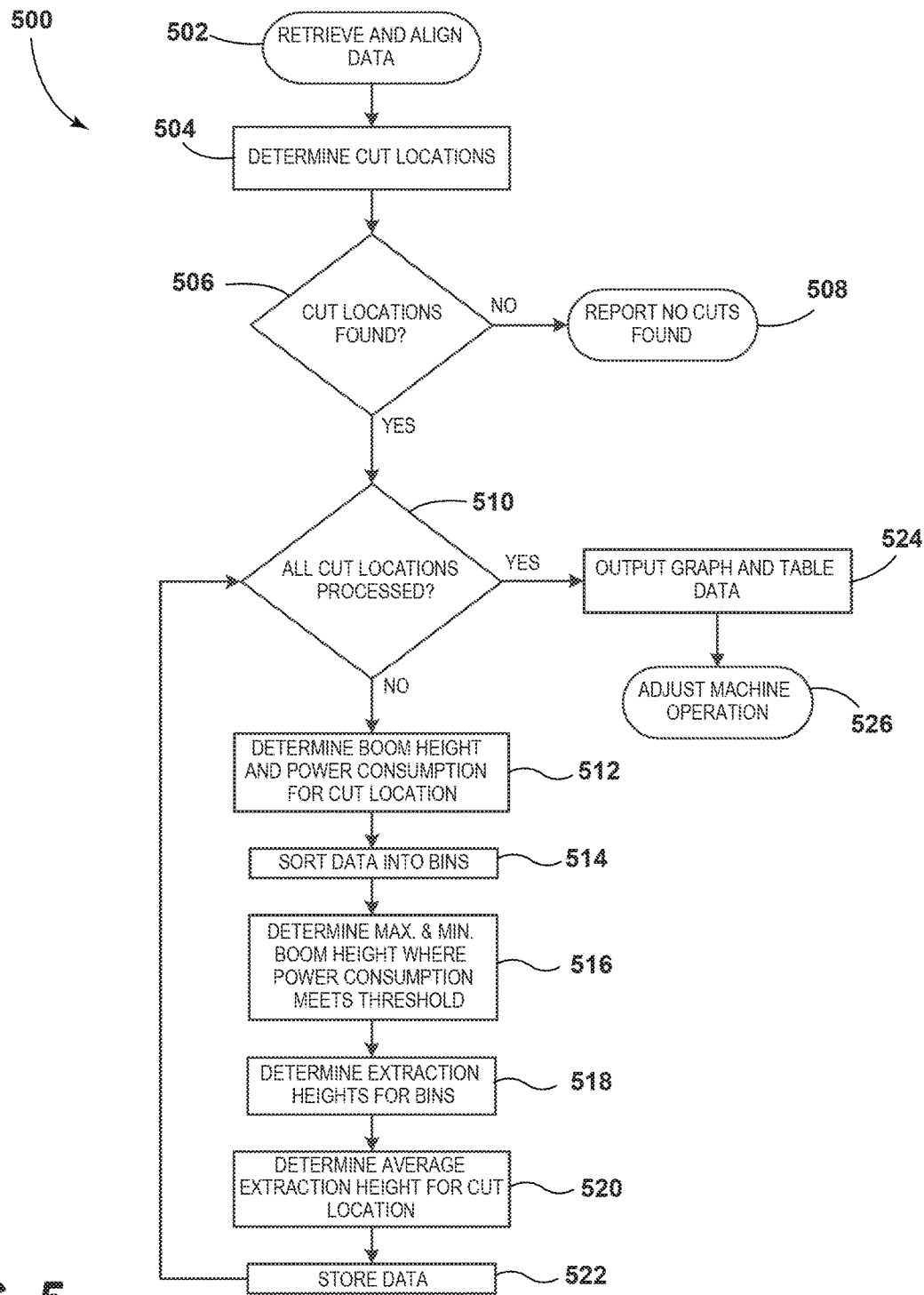
FIG. 5 is a flow chart illustrating a method for determining the average extraction per cut location for the continuous mining machine of FIG. 1 according to some embodiments.

The quantity of coal extracted from the cuts, among other things, can be determined using the extraction height and the cut start and end times determined using the method 400. FIG. 5 illustrates an exemplary method 500 for determining the average extraction per cut location. As an example, the method 500 is described as being performed using the electronic controller 202. This should not be considered limiting. The method 500 may be performed by the electronic controller 202, the server 208, another controller (not shown), or a combination of the foregoing.

The method 500 begins with retrieving and aligning data for a period of time (e.g., a day, a shift, etc.). The data includes the cut start and end times, the boom height data, and the power consumption data, as described above. The data may be retrieved from the memory 214, the database 210, or from another computer-readable storage medium integrated with, or separate from, the continuous mining machine 100. Alternative embodiments may include more or different data sources useful for determining the extraction height. Because the data may come from separate sources on the continuous mining machine 100, there may be different numbers of data points for a given variable during the same time period. Aligning the data involves adjusting the data points to match up over the time period being analyzed. For example, the electronic controller 202 may determine, for each second, a data point representing boom height and a data point representing the power consumption during that second (e.g., the amps drawn by the cutting drum motor 112).

At block 504, cut locations are determined for the aligned data based on the cut start times and cut end times, as determined, for example, using the method 400. At block 506, if not cut locations are found for the time period being analyzed, the electronic controller 202 reports that no cuts were found, at block 508. For example, the electronic controller 202 may display, on the display computer 206, a message to an operator of the continuous mining machine 100. At block 510, the electronic controller 202 determines whether all the cut locations found, at block 506, have been processed.

When at least one cut location remains, at block 512, the electronic controller 202 determines the boom height data and the power consumption data for the cut location by retrieving the data between the cut start time and the cut end time for that location. At block 514, the data determined at block 512 is sorted into bins (e.g., a plurality of bins). In one example, thirty-second bins are used. In other examples, smaller or larger data bins may be used. At block 516, for each data bin, a maximum boom height and a minimum boom height are determined from the boom height data in that data bin. In some embodiments, to help ensure that the machine was producing while the boom was moving (rather than the boom moving for maintenance or other purposes), the power consumption data value corresponding to each of the minimum and maximum height values must meet a threshold. For example, the value of the threshold may be determined based on the power consumed driving the cutting drum 104 when the continuous mining machine 100 is removing material. In one embodiment, when the amps drawn by the cutting drum motor 112 meet a threshold (e.g., 64 amps), it indicates that the continuous mining machine 100 is producing coal. Similarly, when the amps drawn are below the threshold, it indicates that, although the cutting boom 102 may be shearing, the continuous mining machine 100 is not producing coal. The threshold may vary depending on characteristics of the continuous mining machine 100 (e.g., the size of the cutting drum motor 112) and the type of propulsion that drives the cutting drum 104 (e.g., electric, hydraulic, etc.).

At block 518, the electronic controller 202 determines a plurality of extraction heights (i.e., one extraction height for each of the bins). For each bin, the following formula may be used to determine the extraction height:

$$\text{Extraction Height} = (BH_{max} - BH_{min}) + CD_{dia}$$

where $BH_{max}$ is the maximum boom height for the bin, $BH_{min}$ is the minimum boom height for the bin, and $CD_{dia}$ is the cutting drum diameter.

At block 520, the average extraction height for the cut location is determined by from the extraction height values for the bins of that cut location. In some embodiments, the electronic controller 202 determines a subset of extraction heights for a cut location, based on an extraction height threshold. For each bin, the determined extraction height is compared to a pre-determined minimum extraction height. If the determined value does not meet the pre-determined minimum, then the predetermined value is replaced with NaN (i.e., not a number). The subset of remaining determined values is averaged to determine the average extraction height for the cut location.

Figure 7A:
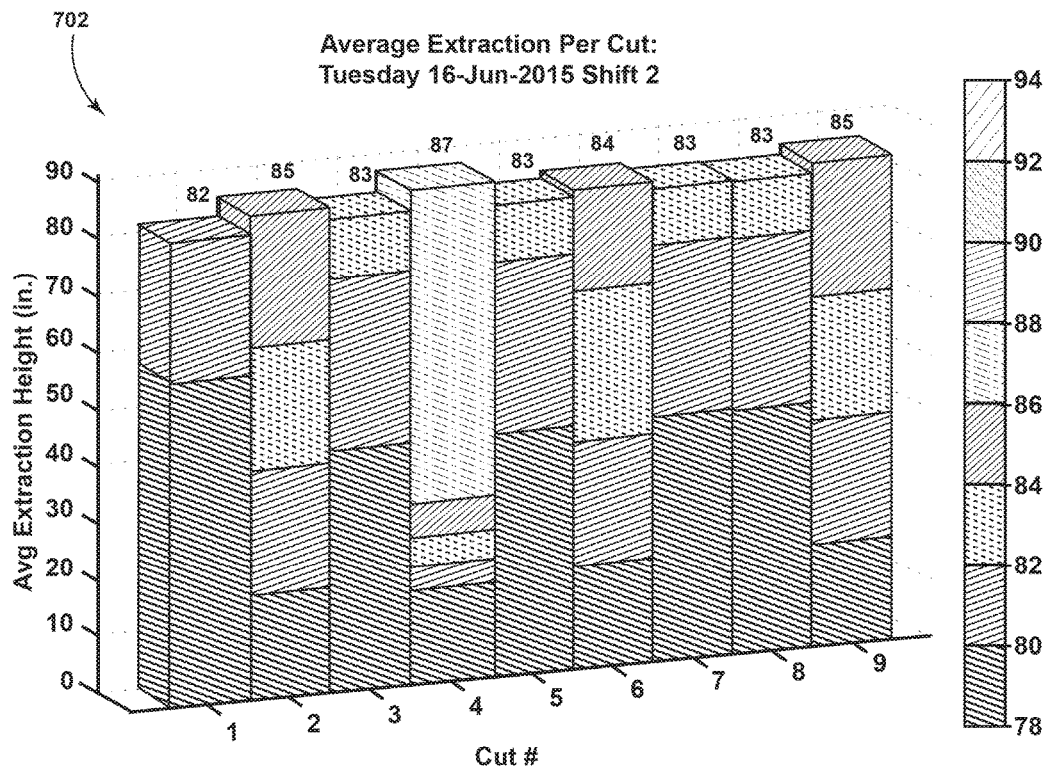
FIG. 7A is a chart illustrating the average extraction height for a series of cuts made by a continuous mining machine according to some embodiments.
Figure 7B:
FIG. 7B is a chart illustrating the underlying data from the chart of FIG. 7A according to some embodiments.

At block 522, the average extraction height, and the data used to determine it, is stored in a memory (e.g., the memory 214 or the database 210). At block 510, the method is repeated for each cut location to determine the average extraction height for all cut locations contained in the data. At block 524, when all of the cut locations have been processed, the electronic processor outputs a graphical representation (e.g., a visual representation the average extraction height for a series of cut locations) and table of the data, based on the average extraction heights for the cut locations. For example, FIG. 7A illustrates a graph 702, which depicts a plurality of parallel columns, which indicate the average extraction heights for nine cut locations. FIG. 7B illustrates a table 704, which depicts the data illustrated in FIG. 7A, which data was determined using the methods 400 and 500. In some embodiments, the cut location times and the average extraction height may be used to determine a volume of material (e.g., coal) extracted during a cut.

Figure 8:
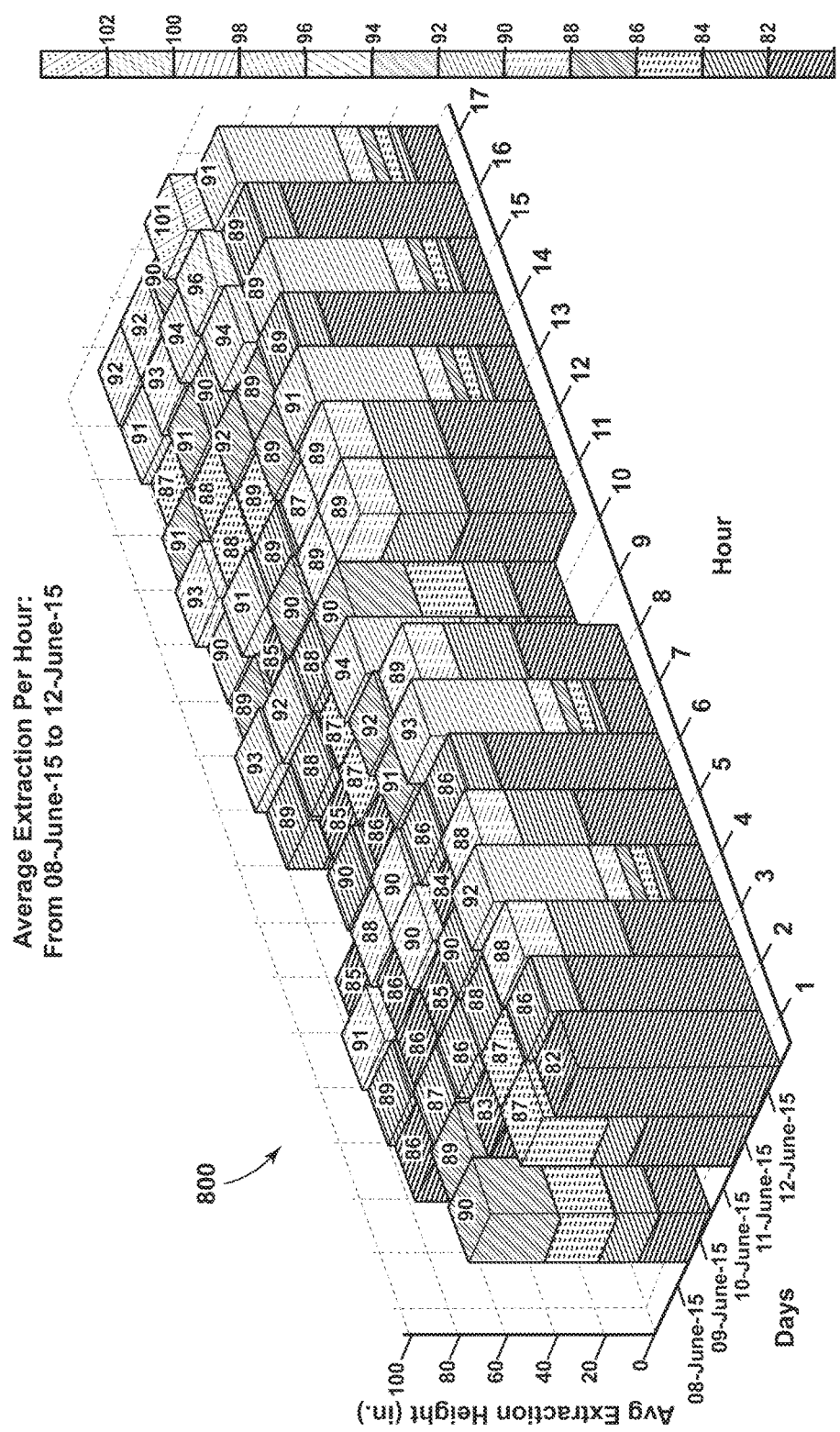
FIG. 8 is a chart illustrating the average extraction per hour for a continuous mining machine according to some embodiments.

In some embodiments, the average extraction height for a given time unit (e.g., an hour, a shift, a day) may be determined and represented visually. For example, data for boom height and power consumption may be pulled and aligned for the start and end times of a particular period, such as a day. As described above, the data may be sorted into bins and extraction heights determined, as described above. The data may be reshaped into, for example, one hour bins (i.e., each consisting of 120 30 s bins). For each one hour bin, the average extraction height for each hour over the course of a day may be determined. For example, FIG. 8 illustrates a graph 800, which depicts the average extraction per hour over the course of several days.

Returning now to FIG. 5, when the data has been processed, stored, and reported, it may be used to adjust the operation of the mining machine, at block 526. For example, the shearing motion may be adjusted to improve production of the continuous mining machine 100. In some embodiments, a mining location set point is determined, and the shearing operation is adjusted based on the set point. The set point is determined based on the seam height of the wanted material (e.g., coal) and at least one mining condition. A mining condition may be an amount of other materials (e.g., rock or clay) that a mine site may want to extract. For example, out of seam dilution may be reduced by adjusting the extraction height based on a set point determined to produce less dilution. Less dilution requires less processing of the mined material. In another example, because rocks and clays above and below the coal seam are heavier and more abrasive than coal, the set point may be determined to reduce wear on production equipment.

The set point or operational adjustment may be determined based on other mining conditions. For example, surface subsidence is often compensated based on extraction. Reduced over-extraction saves this compensation cost. Furthermore, non-consumable gob brought to the surface is considered hazardous material. Long-term or permanent storage is costly. In addition, mining machinery is rated for a lifecycle based on accumulated tons handled. Reduced handling of non-salable material adds to the overall value of the equipment. Accordingly, some embodiments reduce over-extraction by adjusting the operation of the continuous mining machine 100.

In another example, the average extraction heights can be compared across individual operators to identify operator training opportunities. Extraction data can also be compared to other production data to determine trends or correlations.

Patterns can be identified by comparing the extraction data by operator, shift, or cut location. This may identify operator training opportunities, show discrepancies between shifts, or provide other insights into mine productivity that were not possible before. Monitoring extraction allows a view of best practices. Best cut cycles and operator techniques can be rewarded, resulting in higher prioritization on out of seam dilution.

Various features and advantages of the invention are set forth in the following claims.

What is claimed is:

1. A method for monitoring a mining machine including an electronic controller, the method comprising:
   operating the mining machine to cut into a mine face using a shearing motion at a plurality of cut locations;
   for each of the plurality of cut locations;
      generating, using a boom height sensor mounted on a boom of the mining machine, boom height data;
      generating, using a power sensor, power consumption data;
      determining, with the electronic controller, a cut start time based on a conveyor motor start time;
      determining a conveyor motor stop time;
      determining whether a relocation has occurred; and
      when the relocation has occurred;
         determining a cut end time based on conveyor motor stop time and the relocation;
         storing, in a memory coupled to the electronic processor, the cut start time, the cut end time, the boom height data, and the power consumption data; and
   adjusting the operation of the mining machine based on the cut start time, the cut end time, the boom height data, and the power consumption data for at least one of the plurality of cut locations.

2. The method of claim 1, wherein determining whether a relocation has occurred includes determining whether a conveyor motor is off; and
   when the conveyor motor is off
      determining whether or not a relocation threshold has been met; and
      when the relocation threshold has been met;
         determining whether a conveyor time threshold has been met; and
      when the relocation threshold has not been met;
         determining whether the mining machine has been turning for a pre-determined time; and
         when the mining machine has been turning for a pre-determined time determining whether a conveyor time threshold has been met.

3. The method of claim 2, wherein the relocation threshold is one of a relocation threshold time and a relocation tram check time.

4. The method of claim 1, further comprising:
   for each of the plurality of cut locations;
      sorting the boom height data and the power consumption data into a plurality of bins;
      determining a plurality of extraction heights, each of the plurality of extraction heights based on one of the plurality of bins;
      determining a subset of extraction heights based on the plurality of extraction heights and an extraction height threshold;
      determining an average extraction height for the cut location based on the subset of extraction heights; and
      storing, in the memory, the average extraction height.

5. The method of claim 4, further comprising:
   determining a mining location set point;
   adjusting the operation of the mining machine based on the average extraction height for at least one of the plurality of cut locations and the mining location set point.

6. The method of claim 5, wherein determining a mining location set point includes determining a material seam height and at least one mining condition.

7. The method of claim 5, wherein adjusting the operation of the mining machine includes adjusting the shearing motion.

8. The method of claim 4, further comprising:
   generating a graphical representation based on the average extraction height for each of the plurality of cut locations, the graphical representation including a plurality of parallel columns each providing an indication of the average extraction height for one of the plurality of cut locations, and
   displaying the graphical representation on a graphical user interface.

9. The method of claim 4, further comprising:
   determining a material volume based on the average extraction height and the cut location.

10. The method of claim 4, wherein determining the plurality of extraction heights includes, for each of the plurality of bins,
    when the power consumption data meets a threshold;
       determining a maximum boom height value;
       determining a minimum boom height value; and
    subtracting the minimum boom height value from the maximum boom height value; and
    adding a cutting drum diameter.

11. A mining machine comprising:
    a boom including a cutting drum;
    a boom height sensor mounted on the boom;
    a power sensor;
    a memory;
    an electronic controller coupled to the boom height sensor, the power sensor, and the memory, and configured to;
    operate the mining machine to cut into a mine face with the cutting drum in a shearing motion at a plurality of cut locations;
    for each of the plurality of cut locations;
       generate, using the boom height sensor, boom height data;
       generate, using the power sensor, power consumption data;
       determine a cut start time based on a conveyor motor start time;
       determine a conveyor motor stop time;
       determine whether a relocation has occurred; and
       when the relocation has occurred;
          determine a cut end time based on conveyor motor stop time and the relocation;
          store, in a memory coupled to the electronic processor, the cut start time, the cut end time, the boom height data, and the power consumption data; and
    adjust the operation of the mining machine based on the cut start time, the cut end time, the boom height data, and the power consumption data for at least one of the plurality of cut locations.

12. The mining machine of claim 11, further comprising:
    a conveyor motor coupled to the electronic controller;
    wherein the electronic controller is configured to
    determine whether the conveyor motor is off; and when the conveyor motor is off
  determine whether or not a relocation threshold has been met; and
  when the relocation threshold has been met;
    determine whether a conveyor time threshold has been met; and
  when the relocation threshold has not been met;
    determine whether the mining machine has been turning for a pre-determined time; and
    when the mining machine has been turning for a pre-determined time determine whether a conveyor time threshold has been met.

13. The mining machine of claim 12, wherein the relocation threshold is one of a relocation threshold time and a relocation tram check time.

14. The mining machine of claim 11, wherein the electronic controller is configured to for each of the plurality of cut locations;
  sort the boom height data and the power consumption data into a plurality of bins;
  determine a plurality of extraction heights, each of the plurality of extraction heights based on one of the plurality of bins;
  determine a subset of extraction heights based on the plurality of extraction heights and an extraction height threshold;
  determine an average extraction height for the cut location based on the subset of extraction heights; and
  store, in the memory, the average extraction height.

15. The mining machine of claim 14, wherein the electronic controller is configured to
  determine a mining location set point;
  adjust the operation of the mining machine based on the average extraction height for at least one of the plurality of cut locations and the mining location set point.

16. The mining machine of claim 15, wherein the electronic controller is configured to
  determine a material seam height;
  determine at least one mining condition; and
  determine the mining location set point based on the material seam height and the at least one mining condition.

17. The mining machine of claim 15, wherein adjusting the operation of the mining machine includes adjusting a shearing operation.

18. The mining machine of claim 14, further comprising:
  a display computer including a graphical user interface;
  wherein the electronic controller is configured to
    generate a graphical representation based on the average extraction height for each of the plurality of cut locations, the graphical representation including a plurality of parallel columns each providing an indication of the average extraction height for one of the plurality of cut locations, and
  display the graphical representation on the graphical user interface.

19. The mining machine of claim 14, wherein the electronic controller is configured to determine a material volume based on the average extraction height and the cut location.

20. The mining machine of claim 14, wherein the electronic controller is configured to, for each of the plurality of bins,
  when the power consumption data meets a threshold;
    determine a maximum boom height value;
    determine a minimum boom height value; and
    subtract the minimum boom height value from the maximum boom height value; and
  add a cutting drum diameter.

* * * * *